US012645056B2

(12) United States Patent
Liu

(10) Patent No.: US 12,645,056 B2
(45) Date of Patent: Jun. 2, 2026

(54) IMAGING LENS

(71) Applicant: GUANGZHOU LUXVISIONS INNOVATION TECHNOLOGY LIMITED, Guangzhou (CN)

(72) Inventor: Chuan-Hui Liu, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 283 days.

(21) Appl. No.: 18/637,475

(22) Filed: Apr. 17, 2024

(65) Prior Publication Data

US 2025/0013012 A1 Jan. 9, 2025

(30) Foreign Application Priority Data

Jul. 7, 2023 (CN) .......................... 202310832316.6

(51) Int. Cl.
*G02B 9/62* (2006.01)
*G02B 13/00* (2006.01)
(52) U.S. Cl.
CPC ........... *G02B 13/0045* (2013.01); *G02B 9/62* (2013.01); *G02B 13/0065* (2013.01)
(58) Field of Classification Search
CPC ... G02B 13/0045; G02B 9/62; G02B 13/0065
See application file for complete search history.

(56) References Cited

U.S. PATENT DOCUMENTS

2021/0199936 A1 7/2021 Dai et al.

FOREIGN PATENT DOCUMENTS

| | | |
|---|---|---|
| CN | 208110149 | 11/2018 |
| CN | 111812806 | 10/2020 |
| CN | 111830683 | 10/2020 |
| CN | 112782833 | 5/2021 |
| CN | 113253436 | 8/2021 |
| CN | 115712193 | 2/2023 |
| WO | 2022056727 | 3/2022 |

OTHER PUBLICATIONS

WO 2022056727 A1 machine translation (Year: 2022).*
TW 201504666 A machine translation (Year: 2015).*
"Office Action of China Counterpart Application", issued on Feb. 2, 2026, pp. 1-6.

* cited by examiner

*Primary Examiner* — James A Dudek
(74) *Attorney, Agent, or Firm* — JCIPRNET

(57) ABSTRACT

An imaging lens includes a first lens, a prism, a second lens, a third lens, a fourth lens, a fifth lens, and a sixth lens in order along an optical axis from an object side to an image side. The first lens is disposed at a light incident side of the prism, the second to sixth lenses are disposed at a light exit side of the prism, and the optical axis turns on a reflection surface of the prism. The imaging lens has a total of six lenses with diopters. The first to sixth lenses are all aspherical lenses, and the diopters are positive, positive, negative, positive, positive, and negative respectively. A ratio of a focal length of the first lens and a spacing between the prism and the second lens on the optical axis is greater than or equal to 4 and less than or equal to 60.

10 Claims, 8 Drawing Sheets

10

IMAGING LENS

CROSS-REFERENCE TO RELATED APPLICATION

This application claims the priority benefit of China application serial no. 202310832316.6, filed on Jul. 7, 2023. The entirety of the above-mentioned patent application is hereby incorporated by reference herein and made a part of this specification.

BACKGROUND OF THE INVENTION

Field of the Invention

The invention relates to an optical device, in particular to an imaging lens.

Description of Related Art

With the popularization of smart phones, photography with smart phones has become mainstream in the camera market. However, because there are clear restrictions on the thickness of smartphones, the imaging lens may not be significantly protruded from the body of the phone, so fewer long-focus lenses are used on smartphones.

SUMMARY OF THE INVENTION

The invention provides an imaging lens with a long focal length, and is small in size and has good optical performance.

According to an embodiment of the invention, an imaging lens includes a first lens, a prism, a second lens, a third lens, a fourth lens, a fifth lens, and a sixth lens in order along an optical axis from an object side to an image side. The first lens is disposed at a light incident side of the prism, the second lens to the sixth lens are disposed at a light exit side of the prism, and the optical axis turns on a reflection surface of the prism. The imaging lens has a total of six lenses with diopters. The first lens to the sixth lens are all aspherical lenses, and the diopters are positive, positive, negative, positive, positive, and negative respectively. A ratio of a focal length of the first lens and a spacing between the prism and the second lens on the optical axis is greater than or equal to 4 and less than or equal to 60.

Based on the above, the imaging lens provided by an embodiment of the invention is configured with the first lens at the light incident side of the prism to condense the light, and the second lens to the sixth lens are disposed at the light exit side of the prism. The imaging lens may be used in smartphones and has a larger effective focal length.

In order to make the above-mentioned features and advantages of the invention more comprehensible, the following specific embodiments are described in detail with reference to the accompanying drawings.

DESCRIPTION OF THE EMBODIMENTS

Figure 1A:
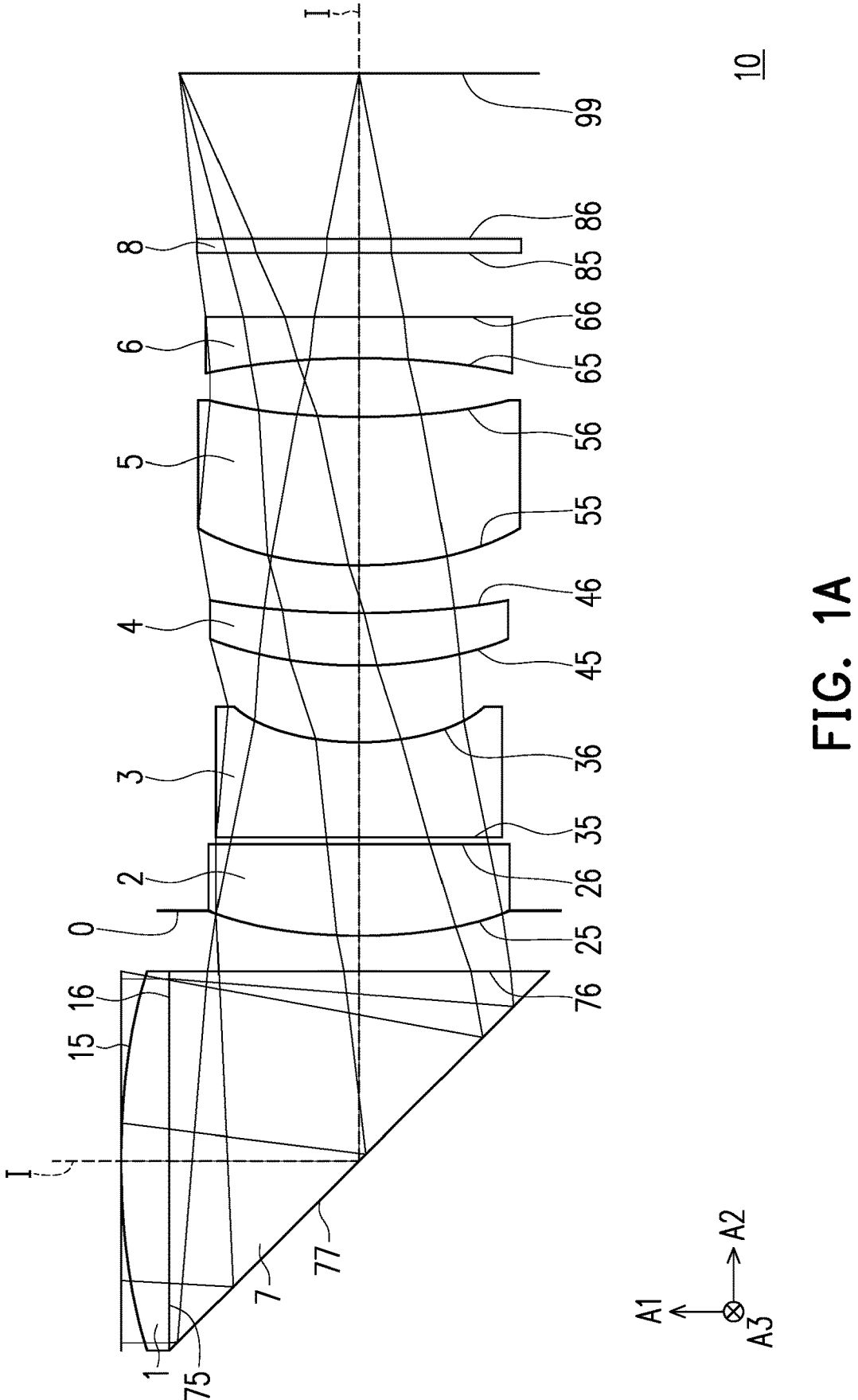
FIG. 1A shows a schematic diagram of an imaging lens in the first focus state according to the first embodiment of the invention.

FIG. 1A shows a schematic diagram of an imaging lens in the first focus state according to the first embodiment of the invention. An imaging lens 10 is a periscope imaging lens, and includes in order a lens 1, a prism 7, a lens 2, a lens 3, a lens 4, a lens 5, a lens 6, and a filter 8 along an optical axis I from the object side to the image side. The lens 1, the lens 2, the lens 3, the lens 4, the lens 5, the lens 6, and the filter 8 each have an object side surface 15, 25, 35, 45, 55, 65, 85 through which imaging light passes and an image side surface 16, 26, 36, 46, 56, 66, 86 through which imaging light passes. The refractive powers of the lens 1, the lens 2, the lens 3, the lens 4, the lens 5, and the lens 6 are respectively positive, positive, negative, positive, positive, and negative, and the lens 1 to the lens 6 are all aspherical lenses, and may include plastic or glass. The object side above is in the positive direction of a direction A1 relative to the imaging lens 10, and the image side is in the positive direction of a direction A2 relative to the imaging lens 10.

The prism 7 includes a light incident surface 75, a light exit surface 76, and a reflection surface 77. The lens 1 is disposed at the light incident side of the prism 7, the lens 2 to the lens 6 are disposed at the light exit side of the prism 7, and the optical axis I turns on the reflection surface 77 of the prism 7. When the light emitted by an object to be photographed at the object side enters the imaging lens 10, the light passing through the lens 1 enters the prism 7 from the light incident surface 75 of the prism 7. After reflection on the reflection surface 77 of the prism 7, the light is emitted from the prism 7 from the light exit surface 76 of the prism 7, then penetrates the lens 2, the lens 3, the lens 4, the lens 5, the lens 6, and the filter 8 in order, and forms an image on an imaging surface 99. The filter 8 is, for example, an infrared cut-off filter, and may allow light with an appropriate wavelength (such as infrared or visible light) to pass through and filter out the infrared band to be filtered.

The optical axis region of the object side surface 15 of the lens 1 is convex and aspherical, and the image side surface 16 is flat and directly attached to the light incident surface 75 of the prism 7. In some embodiments, the total height of both the lens 1 and the prism 7 in the direction A1 is greater than or equal to 5 mm and less than or equal to 10 mm.

It should be noted that compared with the situation in which the lens 1 is not disposed, in the present embodiment, by disposing the lens 1 with positive refractive power on the light incident side of the prism 7, the imaging lens 10 may have a larger field of view and a larger effective focal length, and the amount of incident light of the imaging lens 10 may be increased. Also, since the light is condensed by the lens 1 before entering the prism 7, the diameter of the lens 2 to the lens 6 may be reduced. Specifically, in some embodiments, the diameter of the lens 2, the lens 3, the lens 4, the lens 5, and the lens 6 is greater than or equal to 4 mm and less than or equal to 8.5 mm. Accordingly, the size of the imaging lens 10 is reduced, and the weight, the manufacturing difficulty, and the manufacturing cost thereof are reduced.

The lens 2 has positive refractive power, the optical axis region of the object side surface 25 is a convex surface, the optical axis region of the image side surface 26 is a concave surface, and both the object side surface 25 and the image side surface 26 are aspherical surfaces.

The lens 3 has negative refractive power, the optical axis region of the object side surface 35 is a convex surface, the optical axis region of the image side surface 36 is a concave surface, and both the object side surface 35 and the image side surface 36 are aspherical surfaces.

The lens 4 has positive refractive power, the optical axis region of the object side surface 45 is a convex surface, the optical axis region of the image side surface 46 is a concave surface, and both the object side surface 45 and the image side surface 46 are aspherical surfaces.

The lens 5 has positive refractive power, the optical axis region of the object side surface 55 is a convex surface, the The lens 6 has negative refractive power, the optical axis region of the object side surface 65 is a concave surface, the optical axis region of the image side surface 66 is a convex surface, and both the object side surface 65 and the image side surface 66 are aspherical surfaces. The lens 6 is moved when the imaging lens 10 is focused, and the movement distance thereof is less than 1.5 mm. In contrast, the lens 2, the lens 3, the lens 4, and the lens 5 form a fixed lens group, and the fixed lens group does not move when the imaging lens 10 is focused, and the refractive power of the fixed lens group is positive.

Figure 2A:
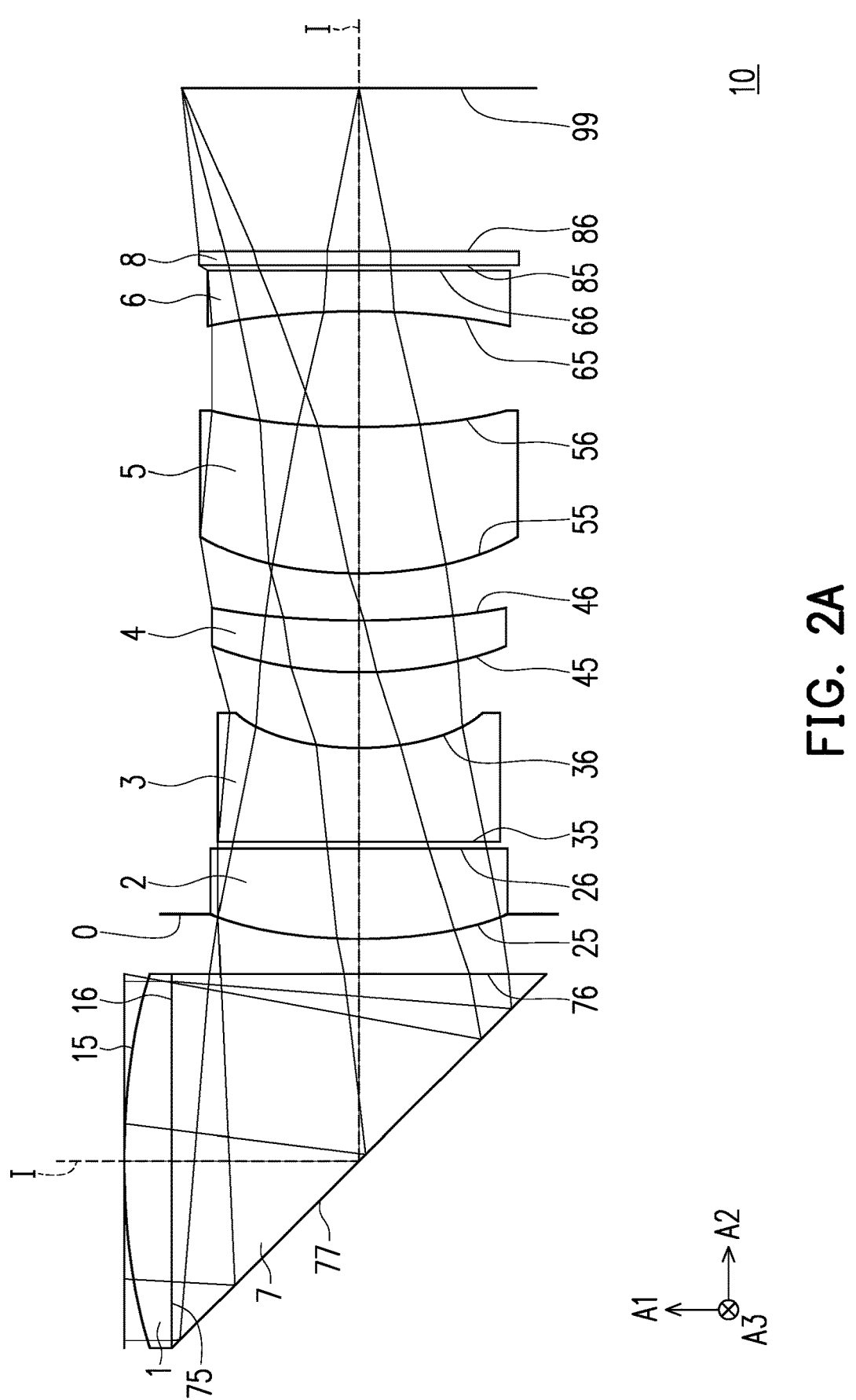
FIG. 2A shows a schematic diagram of an imaging lens in the second focus state according to the first embodiment of the invention.

Please refer to both FIG. 1A and FIG. 2A below, wherein FIG. 2A shows a schematic diagram of an imaging lens in the second focus state according to the first embodiment of the invention. Specifically, FIG. 1A and FIG. 2A are schematic diagrams of an optical system when the imaging lens 10 is focused at infinity (i.e., the first focus state) and 80 cm (i.e., the second focus state) respectively. When the imaging lens is focused at infinity, the distance between the object side surface 15 of the lens 1 and the image side surface 66 of the lens 6 on the optical axis I is minimum.

Other detailed optical data of the first embodiment are shown in Table 1. The half field of view of the imaging lens 10 is 3.584 mm, the effective focal length (EFL) is 19.9 mm, and the aperture value is 2.6.

TABLE 1

| Element | Surface | Radius of curvature (mm) | Spacing (mm) | Refractive index | Abbe number | Focal length (mm) |
|---|---|---|---|---|---|---|
| Object | | Infinity | Z1 | | | |
| Lens 1 | Object side surface 15 | 13.839 | 1.000 | 1.54 | 55.99 | 25.3 |
| | Image side surface 16 | Infinity | 0.000 | | | |
| Prism 7 | Light incident surface 75 | Infinity | 7.650 | 1.78 | 25.76 | |
| | Light exit surface 76 | Infinity | 1.243 | | | |
| Aperture 0 | | Infinity | −0.500 | | | |
| Lens 2 | Object side surface 25 | 8.733 | 1.834 | 1.54 | 55.99 | 18.0 |
| | Image side surface 26 | 71.417 | 0.114 | | | |
| Lens 3 | Object side surface 35 | 85.136 | 1.953 | 1.61 | 26.90 | −7.3 |
| | Image side surface 36 | 4.217 | 1.554 | | | |
| Lens 4 | Object side surface 45 | 5.793 | 1.035 | 1.54 | 55.99 | 25.0 |
| | Image side surface 46 | 9.439 | 1.000 | | | |
| Lens 5 | Object side surface 55 | 6.500 | 3.000 | 1.61 | 26.90 | 16.7 |
| | Image side surface 56 | 14.788 | Z2 | | | |
| Lens 6 | Object side surface 65 | −14.171 | 0.850 | 1.64 | 22.41 | −28.5 |
| | Image side surface 66 | −62.231 | Z3 | | | |
| Filter 8 | Object side surface 85 | Infinity | 0.210 | 1.52 | 64.17 | |
| | Image side surface 86 | Infinity | 3.398 | | | |
| | Imaging surface 99 | Infinity | | | | | optical axis region of the image side surface 56 is a concave surface, and both the object side surface 55 and the image side surface 56 are aspherical surfaces.

In Table 1, the radius of curvature refers to the radius of curvature of each lens at the optical axis region. The spacing of the object side surface 15 (1.000 mm as shown in Table

5

1) is the thickness of the lens 1 on the optical axis I. Since the lens 1 is directly attached to the light incident surface 75 of the prism 7, the spacing of the image side surface 16 of the lens is marked as 0.00 mm. The spacing of the light incident surface 75 of the prism 7 (marked as 7.650 mm in Table 1) is the total length of the optical axis I inside the prism 7 in the direction A1 and the direction A2. The spacing of the light exit surface 76 (1.243 mm as shown in Table 1) is the distance between the light exit surface 76 of the prism 7 and the object side surface 25 of the lens 2 on the optical axis I, that is, the gap between the prism 7 and the lens 2 on the optical axis I, and so on. The spacing of the aperture 0 (−0.500 mm as shown in Table 1) represents the position of the aperture 0 on the optical axis I at 0.500 mm of the image side relative to the object side surface 25 of the lens 2.

When the imaging lens 10 is focused at infinity (i.e., the first focus state, Z1 in Table 1 is infinity), Z2 is 1.200 mm, and Z3 is 1.309 mm, corresponding to the optical architecture shown in FIG. 1A. When the imaging lens 10 is focused at 80 cm (i.e., the second focus state, Z1 in Table 1 is 800 mm), Z2 is 2.409 mm, and Z3 is 0.100 mm, corresponding to the optical architecture shown in FIG. 2A.

As shown in Table 1, FIG. 1A, and FIG. 2A, the lens 2, the lens 4, and the lens 5 of the first embodiment are positive meniscus lenses with the convex surface facing the prism 7. The lens 3 is a negative meniscus lens with a convex surface facing the prism 7. The lens 6 is a negative meniscus lens with a convex surface facing the imaging surface 99.

In the present embodiment, the object side surfaces 15, 25, 35, 45, 55, 65 of the lens 1, the lens 2, the lens 3, the lens 4, the lens 5, and the lens 6 and the image side surfaces 26, 36, 46, 56, 66 of the lens 2, the lens 3, the lens 4, the lens 5, and the lens 6 are all aspherical surfaces, and these aspherical surfaces are defined according to the following formula (1):

$$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i}$$

(1)

Y: distance between the point on the aspherical curve and the optical axis;

Z: aspherical depth, that is, the vertical distance between a point on the aspherical surface that is Y from the optical axis and a tangent plane tangent to the vertex on the optical axis of the aspherical surface;

R: radius of curvature of the lens surface;

K: cone coefficient;

$a_{2i}$: 2i-th order aspheric coefficient.

The cone coefficient K and various aspheric coefficients in the aspherical formula (1) of the present embodiment are shown in Table 2. In particular, the number 15 in Table 2 indicates the aspheric coefficients of the object side surface 15 of the lens 1, the number 25 indicates the aspheric coefficients of the object side surface 25 of the lens 2, the number 26 indicates the aspheric coefficients of the image side surface 26 of the lens 2, and the other numbers are deduced in the same way.

TABLE 2

| Surface | K | $a_4$ | $a_6$ | $a_8$ |
|---|---|---|---|---|
| 15 | 0.00E+00 | −2.93E−05 | −8.20E−08 | −1.06E−08 |
| 25 | 0.00E+00 | −7.29E−05 | −3.58E−05 | −3.41E−06 |

6

TABLE 2-continued

| Surface | K | $a_4$ | $a_6$ | $a_8$ |
|---|---|---|---|---|
| 26 | 0.00E+00 | 6.73E−04 | −1.75E−04 | 1.47E−06 |
| 35 | 0.00E+00 | −1.03E−03 | 1.29E−04 | −2.91E−06 |
| 36 | 0.00E+00 | −3.99E−04 | 1.40E−04 | 1.11E−05 |
| 45 | 0.00E+00 | −3.44E−03 | 1.10E−04 | −1.11E−06 |
| 46 | 0.00E+00 | −5.87E−03 | 5.20E−04 | −4.41E−05 |
| 55 | 0.00E+00 | −2.98E−03 | 2.77E−04 | −1.82E−05 |
| 56 | 0.00E+00 | −5.26E−05 | −3.95E−05 | 8.13E−06 |
| 65 | 0.00E+00 | 1.11E−03 | −1.62E−04 | 9.07E−06 |
| 66 | 0.00E+00 | 1.02E−03 | −9.24E−05 | 3.10E−06 |

| Surface | $a_{10}$ | $a_{12}$ | $a_{14}$ | $a_{16}$ |
|---|---|---|---|---|
| 15 | 6.09E−10 | 0.00E+00 | 0.00E+00 | 0.00E+00 |
| 25 | −1.43E−07 | 1.81E−09 | 1.07E−09 | −1.54E−10 |
| 26 | −6.08E−08 | −1.86E−08 | −1.92E−09 | −2.08E−10 |
| 35 | −8.81E−08 | 1.75E−08 | −4.88E−10 | −5.55E−10 |
| 36 | −1.72E−06 | 1.12E−07 | 4.05E−08 | −3.68E−09 |
| 45 | −1.71E−07 | 3.69E−08 | 1.53E−08 | −8.48E−10 |
| 46 | 4.76E−06 | −2.19E−07 | −1.19E−08 | 1.44E−09 |
| 55 | 3.11E−06 | −3.81E−07 | 2.03E−08 | −3.90E−10 |
| 56 | 3.09E−07 | −3.08E−08 | −4.17E−09 | 2.39E−10 |
| 65 | −9.48E−08 | −4.23E−09 | 3.27E−10 | −2.72E−11 |
| 66 | 4.68E−09 | 0.00E+00 | 0.00E+00 | 0.00E+00 |

Figures 1B, 1C, 1D:
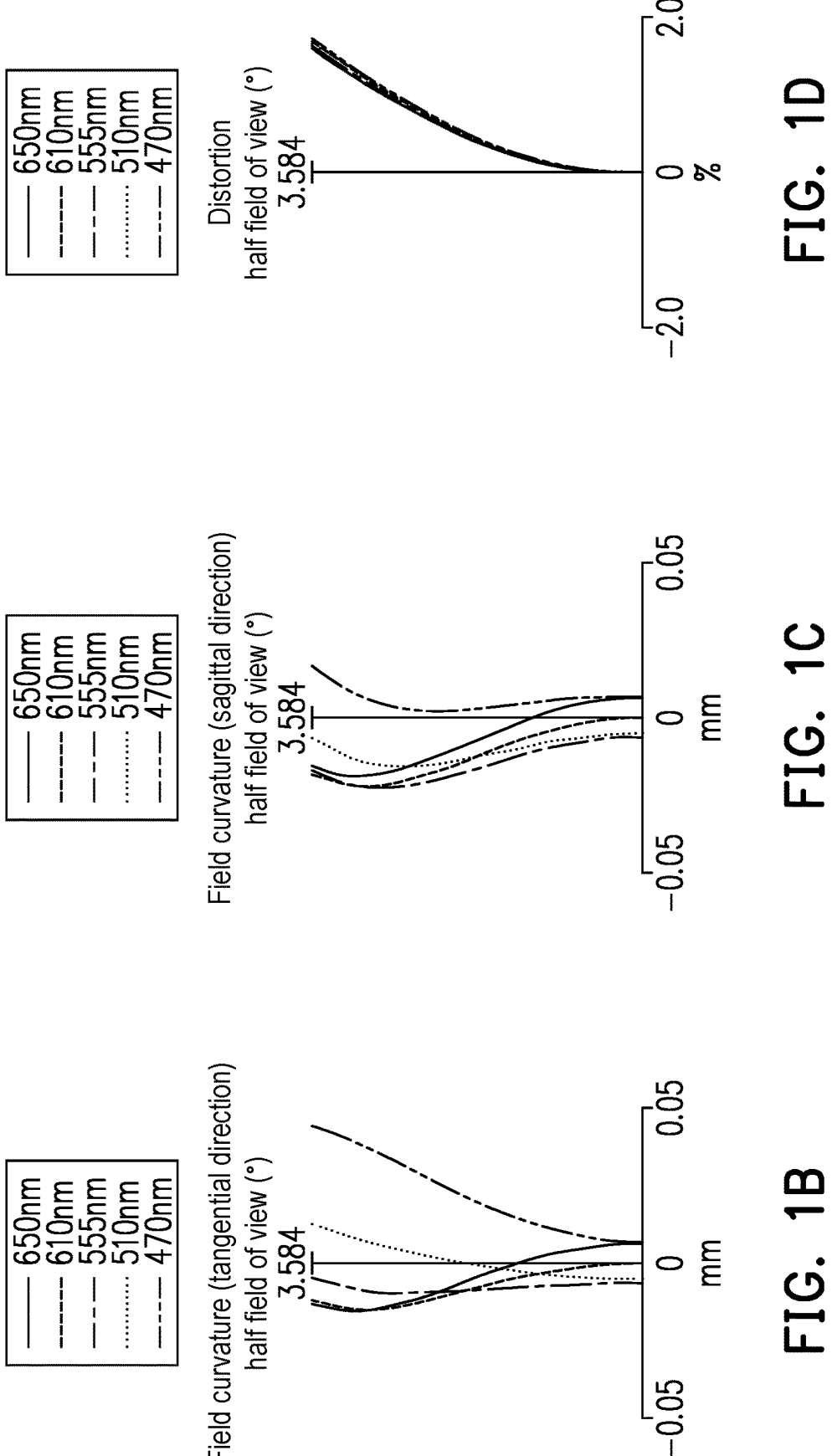
FIG. 1B and FIG. 1C are schematic diagrams of field curvature of the imaging lens of FIG. 1A.
FIG. 1D is a schematic diagram of distortion of the imaging lens of FIG. 1A.

Please refer to FIG. 1B to FIG. 1D, FIG. 1B shows the field curvature aberration curve in the tangential direction when light with wavelengths of 470 nm, 510 nm, 555 nm, 610 nm, and 650 nm respectively enters the imaging lens 10 in the first focus state of the first embodiment, FIG. 1C shows the field aberration curve in the sagittal direction when light with wavelengths of 470 nm, 510 nm, 555 nm, 610 nm, and 650 nm respectively enters the imaging lens 10 in the first focus state of the first embodiment, and FIG. 1D shows the distortion curve when light with wavelengths of 470 nm, 510 nm, 555 nm, 610 nm, and 650 nm respectively enters the imaging lens 10 in the first focus state of the first embodiment.

As shown in the field curvature aberration curves of FIG. 1B and FIG. 1C, the field curvature aberration of the five representative wavelengths within the entire field of view falls within ±0.05 mm, meaning the imaging lens 10 in the first focus state of the first embodiment may effectively eliminate field curvature aberration. As shown in the distortion curve of FIG. 1D, the distortion aberration of the five representative wavelengths in the entire field of view is less than ±2%, meaning the imaging lens 10 in the first focus state of the first embodiment has good imaging quality.

Figures 2B, 2C, 2D:
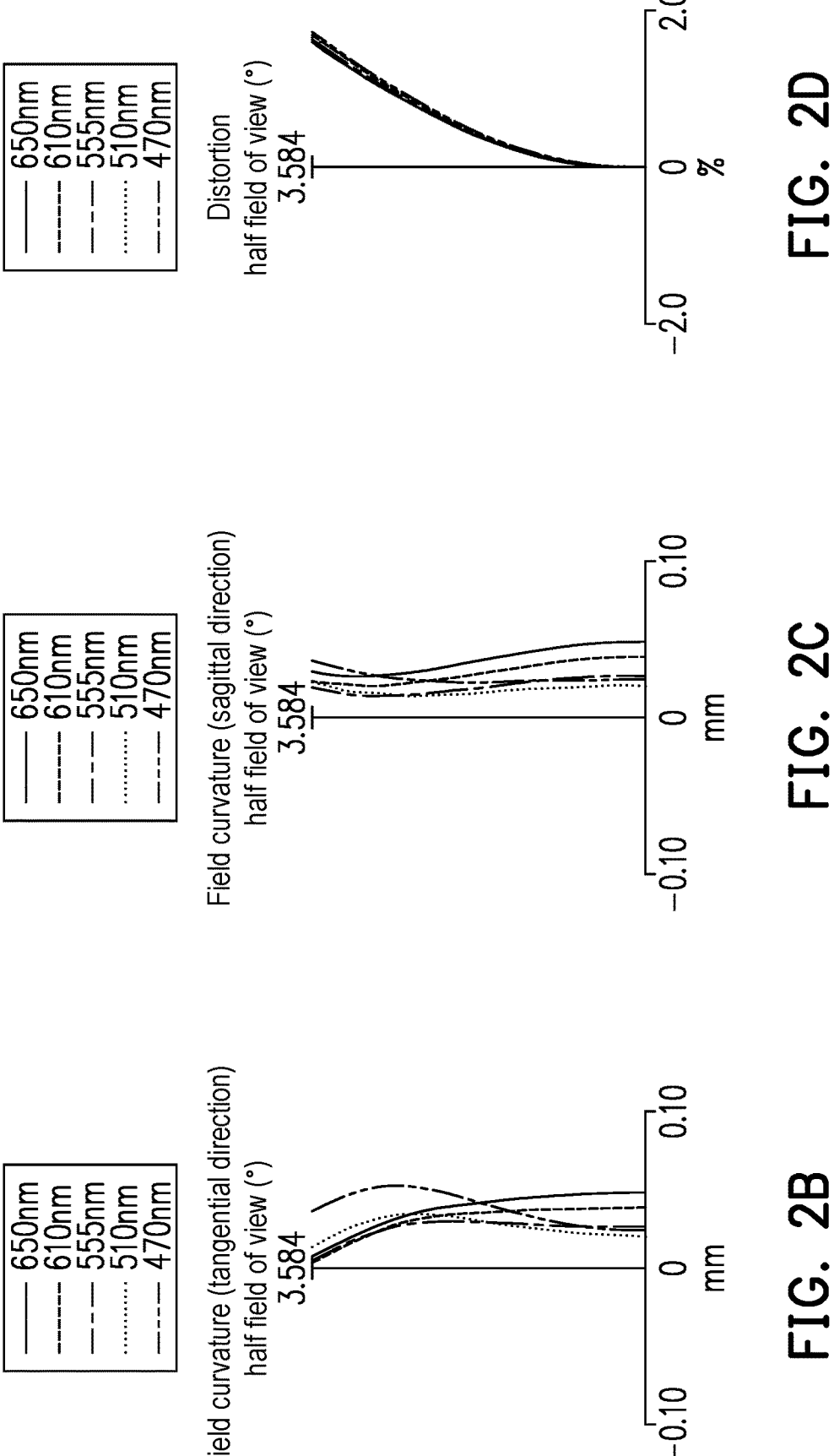
FIG. 2B and FIG. 2C are schematic diagrams of field curvature of the imaging lens of FIG. 2A.
FIG. 2D is a schematic diagram of distortion of the imaging lens of FIG. 2A.

Please refer to FIG. 2B to FIG. 2D, FIG. 2B shows the field curvature aberration curve in the tangential direction when light with wavelengths of 470 nm, 510 nm, 555 nm, 610 nm, and 650 nm respectively enters the imaging lens 10 in the second focus state of the first embodiment, FIG. 2C shows the field aberration curve in the sagittal direction when light with wavelengths of 470 nm, 510 nm, 555 nm, 610 nm, and 650 nm respectively enters the imaging lens 10 in the second focus state of the first embodiment, and FIG. 2D shows the distortion curve when light with wavelengths of 470 nm, 510 nm, 555 nm, 610 nm, and 650 nm respectively enters the imaging lens 10 in the second focus state of the first embodiment.

As shown in the field curvature aberration curves of FIG. 2B and FIG. 2C, the field curvature aberration of the five representative wavelengths within the entire field of view falls within ±0.06 mm, meaning the imaging lens 10 in the second focus state of the first embodiment may effectively eliminate field curvature aberration. As shown in the distortion curve of FIG. 2D, the distortion aberration of the five representative wavelengths in the entire field of view is less than ±2%, meaning the imaging lens 10 in the second focus state of the first embodiment has good imaging quality.

Figure 3A:
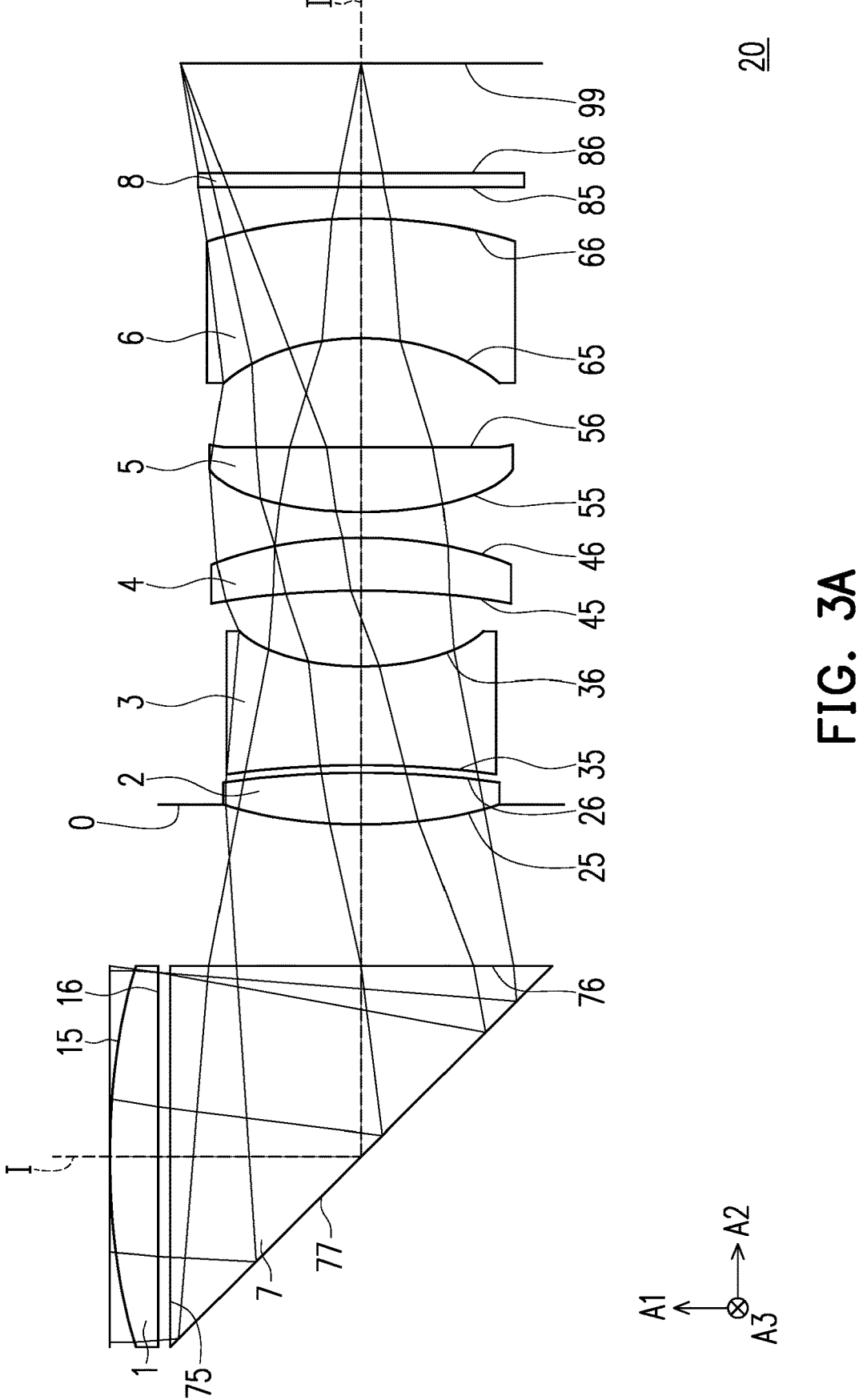
FIG. 3A shows a schematic diagram of an imaging lens in the first focus state according to the second embodiment of the invention.

FIG. 3A shows a schematic diagram of the imaging lens in the first focus state according to the second embodiment of the invention. An imaging lens 20 is a periscope imaging lens, and includes in order the lens 1, the prism 7, the lens 2, the lens 3, the lens 4, the lens 5, the lens 6, and the filter 8 along the optical axis I from the object side to the image side. The lens 1, the lens 2, the lens 3, the lens 4, the lens 5, the lens 6, and the filter 8 each have the object side surface 15, 25, 35, 45, 55, 65, 85 through which imaging light passes and the image side surface 16, 26, 36, 46, 56, 66, 86 through which imaging light passes. The refractive powers of the lens 1, the lens 2, the lens 3, the lens 4, the lens 5, and the lens 6 are respectively positive, positive, negative, positive, positive, and negative, and the lens 1 to the lens 6 are all aspherical lenses. The object side above is in the positive direction of the direction A1 relative to the imaging lens 20, and the image side is in the positive direction of the direction A2 relative to the imaging lens 20.

The prism 7 includes the light incident surface 75, the light exit surface 76, and the reflection surface 77. The lens 1 is disposed at the light incident side of the prism 7, the lens 2 to the lens 6 are disposed at the light exit side of the prism 7, and the optical axis I turns on the reflection surface 77 of the prism 7. When the light emitted by an object to be photographed at the object side enters the imaging lens 20, the light passing through the lens 1 enters the prism 7 from the light incident surface 75 of the prism 7. After reflection on the reflection surface 77 of the prism 7, the light is emitted from the prism 7 from the light exit surface 76 of the prism 7, then penetrates the lens 2, the lens 3, the lens 4, the lens 5, the lens 6, and the filter 8 in order, and forms an image on the imaging surface 99. The filter 8 is, for example, an infrared cut-off filter, and may allow light with an appropriate wavelength (such as infrared or visible light) to pass through and filter out the infrared band to be filtered.

It should be noted that compared with the situation in which the lens 1 is not disposed, in the present embodiment, by disposing the lens 1 with positive refractive power on the light incident side of the prism 7, the imaging lens 20 may have a larger field of view and the amount of incident light may be increased. Moreover, since the light is converged by the lens 1 before entering the prism 7, the diameter of the lens 2 to the lens 6 may be reduced, reducing the size of the imaging lens 20 and reducing the weight, the manufacturing difficulty, and the manufacturing cost thereof.

The optical axis region of the object side surface 15 of the lens 1 is convex and aspherical, and the image side surface 16 is a flat surface.

The lens 2 has positive refractive power, the optical axis region of the object side surface 25 is a convex surface, the optical axis region of the image side surface 26 is a convex surface, and both the object side surface 25 and the image side surface 26 are aspherical surfaces.

The lens 3 has negative refractive power, the optical axis region of the object side surface 35 is a concave surface, the optical axis region of the image side surface 36 is a concave surface, and both the object side surface 35 and the image side surface 36 are aspherical surfaces.

The lens 4 has positive refractive power, the optical axis region of the object side surface 45 is a convex surface, the optical axis region of the image side surface 46 is a convex surface, and both the object side surface 45 and the image side surface 46 are aspherical surfaces.

The lens 5 has positive refractive power, the optical axis region of the object side surface 55 is a convex surface, the optical axis region of the image side surface 56 is a convex surface, and both the object side surface 55 and the image side surface 56 are aspherical surfaces.

The lens 6 has negative refractive power, the optical axis region of the object side surface 65 is a concave surface, the optical axis region of the image side surface 66 is a convex surface, and both the object side surface 65 and the image side surface 66 are aspherical surfaces. The lens 6 is moved when the imaging lens 20 is focused, and the movement distance thereof is less than or equal to 0.4 mm. In contrast, the lens 2, the lens 3, the lens 4, and the lens 5 form a fixed lens group, which does not move when the imaging lens 20 is focused, and the refractive power of the fixed lens group is positive.

Figure 4A:
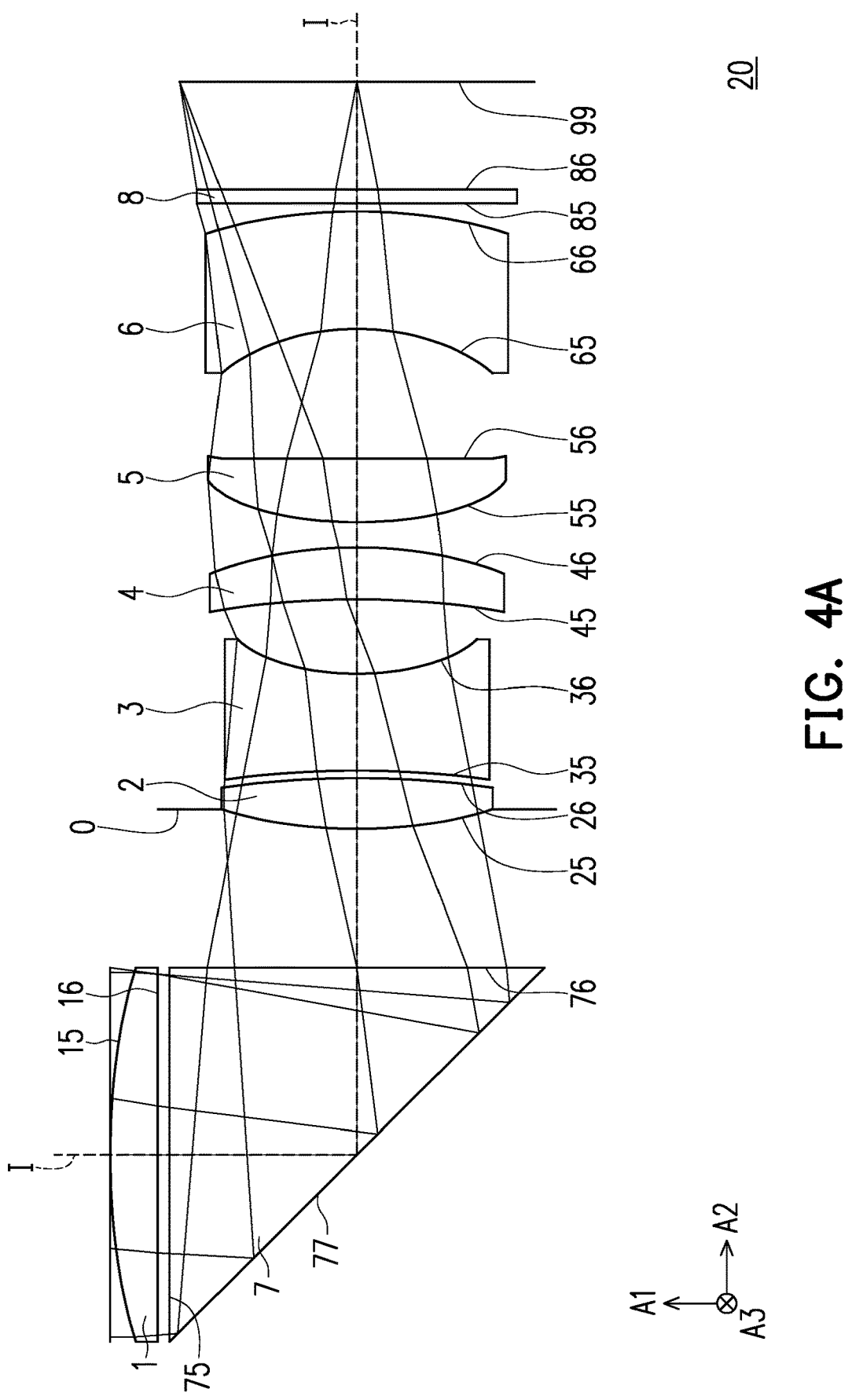
FIG. 4A shows a schematic diagram of an imaging lens in the second focus state according to the second embodiment of the invention.

Please refer to both FIG. 3A and FIG. 4A below, wherein FIG. 4A shows a schematic diagram of an imaging lens in the second focus state according to the second embodiment of the invention. Specifically, FIG. 3A and FIG. 4A are schematic diagrams of the optical system when the imaging lens 20 is focused at infinity (i.e., the first focus state) and 80 cm (i.e., the second focus state) respectively. When the imaging lens is focused at infinity, the distance between the object side surface 15 of the lens 1 and the image side surface 66 of the lens 6 on the optical axis I is minimum.

Other detailed optical data of the second embodiment are shown in Table 3. The half field of view of the imaging lens 20 is 3.584 mm, the effective focal length (EFL) is 19.9 mm, and the aperture value is 2.6.

TABLE 3

| Element | Surface | Radius of curvature (mm) | Spacing (mm) | Refractive index | Abbe number | Focal length (mm) |
|---|---|---|---|---|---|---|
| Object | | Infinity | Z1 | | | |
| Lens 1 | Object side surface 15 | 12.531 | 1.000 | 1.54 | 55.99 | 22.9 |
| | Image side surface 16 | Infinity | 0.100 | | | |
| Prism 7 | Light incident surface 75 | Infinity | 7.650 | 1.78 | 25.76 | |
| | Light exit surface 76 | Infinity | 3.000 | | | |
| Aperture 0 | | Infinity | −0.200 | | | |
| Lens 2 | Object side surface 25 | 8.644 | 1.061 | 1.54 | 55.99 | 13.0 |
| | Image side surface 26 | −37.335 | 0.133 | | | |

TABLE 3-continued

| Element | Surface | Radius of curvature (mm) | Spacing (mm) | Refractive index | Abbe number | Focal length (mm) |
|---------|---------|--------------------------|--------------|------------------|-------------|-------------------|
| Lens 3 | Object side surface 35 | −22.879 | 1.994 | 1.61 | 26.90 | −6.1 |
| | Image side surface 36 | 4.632 | 1.425 | | | |
| Lens 4 | Object side surface 45 | 23.484 | 1.035 | 1.54 | 55.99 | 27.9 |
| | Image side surface 46 | −42.709 | 0.610 | | | |
| Lens 5 | Object side surface 55 | 6.666 | 1.321 | 1.61 | 26.90 | 10.1 |
| | Image side surface 56 | −75.193 | Z2 | | | |
| Lens 6 | Object side surface 65 | −3.697 | 2.326 | 1.64 | 22.41 | −15.3 |
| | Image side surface 66 | −7.354 | Z3 | | | |
| Filter 8 | Object side surface 85 | Infinity | 0.210 | 1.52 | 64.17 | |
| | Image side surface 86 | Infinity | 2.500 | | | |
| | Imaging surface 99 | Infinity | | | | |

In Table 3, the spacing of the object side surface 15 (1.000 mm as shown in Table 3) is the thickness of the lens 1 on the optical axis I. The spacing of the image side surface 16 (0.100 mm as shown in Table 3) is the gap between the lens 1 and the prism 7 on the optical axis I. The spacing of the light incident surface 75 of the prism 7 (marked as 7.650 mm in Table 3) is the total length of the optical axis I inside the prism 7 in the direction A1 and the direction A2. The spacing of the light exit surface 76 (3.000 mm as shown in Table 3) is the distance between the light exit surface 76 of the prism 7 and the object side surface 25 of the lens 2 on the optical axis I, that is, the gap between the prism 7 and the lens 2 on the optical axis I, and so on. The spacing of the aperture 0 (−0.200 mm as shown in Table 3) represents the position of the aperture 0 on the optical axis I at 0.200 mm of the image side relative to the object side surface 25 of the lens 2.

When the imaging lens 20 is focused at infinity (i.e., the first focus state, Z1 in Table 3 is infinity), Z2 is 2.234 mm, and Z3 is 0.65 mm, corresponding to the optical architecture shown in FIG. 3A. When the imaging lens 20 is focused at 80 cm (i.e., the second focus state, Z1 in Table 3 is 800 mm), Z2 is 2.634 mm, and Z3 is 0.25 mm, corresponding to the optical architecture shown in FIG. 4A.

As shown in Table 3, FIG. 3A, and FIG. 4A, the lens 2, the lens 4, and the lens 5 of the second embodiment are biconvex lenses. The lens 3 is a biconcave lens. The lens 6 is a negative meniscus lens with a convex surface facing the imaging surface 99.

In the present embodiment, the object side surfaces 15, 25, 35, 45, 55, 65 of the lens 1, the lens 2, the lens 3, the lens 4, the lens 5, and the lens 6 and the image side surfaces 26, 36, 46, 56, 66 of the lens 2, the lens 3, the lens 4, the lens 5, and the lens 6 are all aspherical surfaces, and these aspherical surfaces are defined according to formula (1).

The cone coefficient K and various aspheric coefficients in the aspherical formula (1) of the present embodiment are shown in Table 4. In particular, the number 15 in Table 4 indicates the aspheric coefficients of the object side surface 15 of the lens 1, the number 25 indicates the aspheric coefficients of the object side surface 25 of the lens 2, the number 26 indicates the aspheric coefficients of the image side surface 26 of the lens 2, and the other numbers are deduced in the same way.

TABLE 4

| Surface | K | $a_4$ | $a_6$ | $a_8$ |
|---------|---|-------|-------|-------|
| 15 | 0.00E+00 | −4.89E−05 | −1.22E−06 | 1.28E−07 |
| 25 | 0.00E+00 | 8.45E−04 | −1.52E−04 | −1.31E−05 |
| 26 | 0.00E+00 | 1.04E−03 | −4.00E−04 | −9.11E−06 |
| 35 | 0.00E+00 | −1.93E−03 | 2.51E−04 | −5.21E−06 |
| 36 | 0.00E+00 | 7.61E−06 | 3.37E−04 | 1.84E−05 |
| 45 | 0.00E+00 | −4.35E−03 | −3.77E−05 | −1.46E−06 |
| 46 | 0.00E+00 | −5.24E−03 | 4.68E−04 | −4.49E−05 |
| 55 | 0.00E+00 | −2.44E−03 | 3.66E−04 | −2.06E−05 |
| 56 | 0.00E+00 | −4.22E−05 | −1.21E−04 | 2.21E−05 |
| 65 | 0.00E+00 | 6.82E−03 | −4.38E−04 | 6.03E−05 |
| 66 | 0.00E+00 | 2.85E−03 | −1.23E−04 | −2.68E−06 |

| Surface | $a_{10}$ | $a_{12}$ | $a_{14}$ | $a_{16}$ |
|---------|----------|----------|----------|----------|
| 15 | −4.43E−09 | −2.01E−10 | 1.77E−11 | −3.25E−13 |
| 25 | −1.93E−06 | −9.70E−08 | −1.30E−09 | −2.41E−09 |
| 26 | −3.67E−07 | −4.07E−08 | 4.63E−09 | −1.93E−09 |
| 35 | 1.16E−07 | 1.93E−07 | 4.38E−09 | −2.59E−09 |
| 36 | −2.59E−06 | 4.52E−07 | 1.31E−07 | −1.60E−08 |
| 45 | 9.50E−07 | 1.65E−09 | 1.03E−08 | 5.56E−10 |
| 46 | 2.83E−06 | −2.76E−07 | −5.23E−09 | 1.29E−09 |
| 55 | 3.59E−06 | −3.73E−07 | 1.83E−08 | −2.90E−10 |
| 56 | 1.64E−06 | −7.26E−08 | −1.16E−08 | 6.30E−10 |
| 65 | −9.79E−07 | −1.52E−07 | 1.49E−09 | 7.68E−10 |
| 66 | 1.60E−06 | −7.64E−08 | −3.84E−09 | 2.83E−10 |

Figures 3B, 3C, 3D:
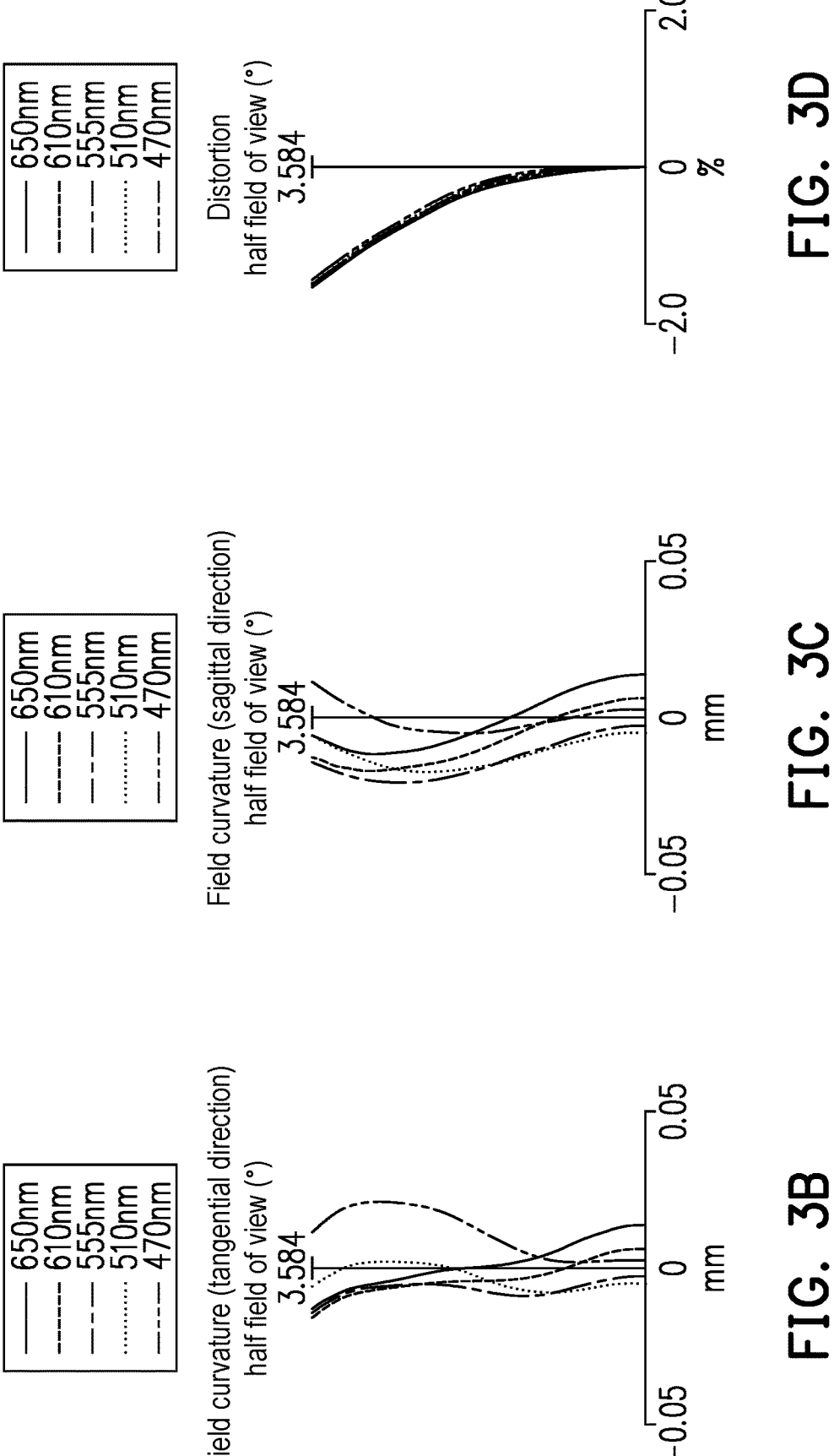
FIG. 3B and FIG. 3C are schematic diagrams of field curvature of the imaging lens of FIG. 3A.
FIG. 3D is a schematic diagram of distortion of the imaging lens of FIG. 3A.

Please refer to FIG. 3B to FIG. 3D, FIG. 3B shows the field curvature aberration curve in the tangential direction when light with wavelengths of 470 nm, 510 nm, 555 nm, 610 nm, and 650 nm respectively enters the imaging lens 20 in the first focus state of the second embodiment, FIG. 3C shows the field aberration curve in the sagittal direction when light with wavelengths of 470 nm, 510 nm, 555 nm, 610 nm, and 650 nm respectively enters the imaging lens 20 in the first focus state of the second embodiment, and FIG. 3D shows the distortion curve when light with wavelengths of 470 nm, 510 nm, 555 nm, 610 nm, and 650 nm respectively enters the imaging lens 20 in the first focus state of the second embodiment.

As shown in the field curvature aberration curves of FIG. 3B and FIG. 3C, the field curvature aberration of the five representative wavelengths within the entire field of view falls within ±0.03 mm, meaning the imaging lens 20 in the first focus state of the second embodiment may effectively eliminate field curvature aberration. As shown in the distortion curve of FIG. 3D, the distortion aberration of the five representative wavelengths in the entire field of view is less than ±2%, meaning the imaging lens 20 in the first focus state of the second embodiment has good imaging quality.

Figures 4B, 4C, 4D:
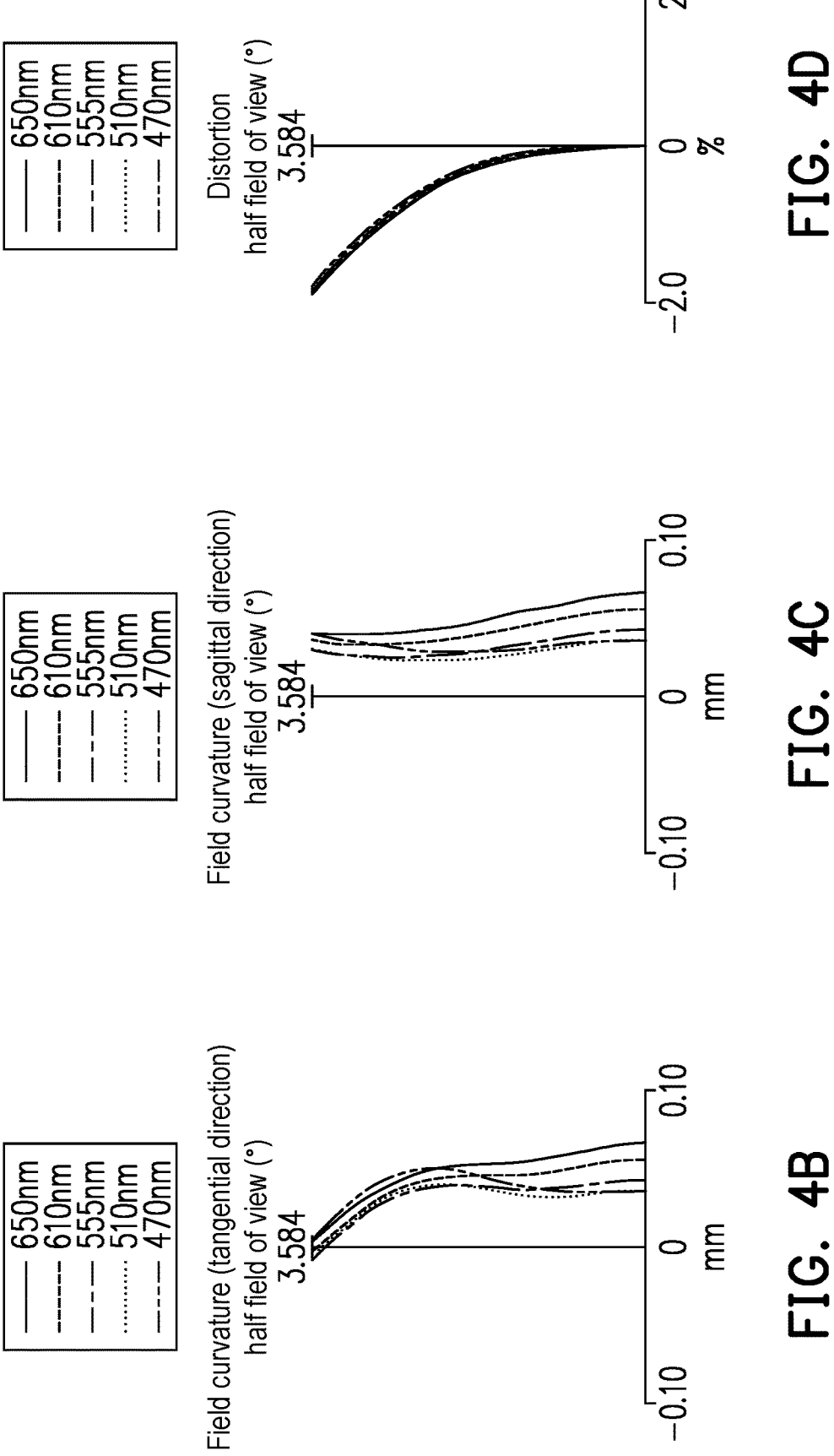
FIG. 4B and FIG. 4C are schematic diagrams of field curvature of the imaging lens of FIG. 4A.
FIG. 4D is a schematic diagram of distortion of the imaging lens of FIG. 4A.

Please refer to FIG. 4B to FIG. 4D, FIG. 4B shows the field curvature aberration curve in the tangential direction when light with wavelengths of 470 nm, 510 nm, 555 nm, 610 nm, and 650 nm respectively enters the imaging lens 20 in the second focus state of the second embodiment, FIG. 4C shows the field aberration curve in the sagittal direction when light with wavelengths of 470 nm, 510 nm, 555 nm, 610 nm, and 650 nm respectively enters the imaging lens 20 in the second focus state of the second embodiment, and FIG. 4D shows the distortion curve when light with wavelengths of 470 nm, 510 nm, 555 nm, 610 nm, and 650 nm respectively enters the imaging lens 20 in the second focus state of the second embodiment.

As shown in the field curvature aberration curves of FIG. 4B and FIG. 4C, the field curvature aberration of the five representative wavelengths within the entire field of view falls within ±0.10 mm, meaning the imaging lens 20 in the second focus state of the second embodiment may effectively eliminate field curvature aberration. As shown in the distortion curve of FIG. 4D, the distortion aberration of the five representative wavelengths in the entire field of view is less than ±2%, meaning the imaging lens 20 in the second focus state of the second embodiment has good imaging quality.

Based on the above, the imaging lens provided by an embodiment of the invention is configured with the first lens at the light incident side of the prism to condense the light, and the second lens to the sixth lens are disposed at the light exit side of the prism. The imaging lens may be used in smartphones and has a larger effective focal length.

What is claimed is:

1. An imaging lens, wherein the imaging lens comprises in order along an optical axis from an object side to an image side:

a first lens, a prism, a second lens, a third lens, a fourth lens, a fifth lens, and a sixth lens, wherein the first lens is disposed at a light incident side of the prism, the second lens to the sixth lens are disposed at a light exit side of the prism, and the optical axis turns on a reflection surface of the prism, the imaging lens has a total of six lenses with diopters, the first lens to the sixth lens are all aspherical lenses, and the diopters are positive, positive, negative, positive, positive, and negative respectively, wherein a ratio of a focal length of the first lens and a spacing between the prism and the second lens on the optical axis is greater than or equal to 4 and less than or equal to 60.

2. The imaging lens of claim 1, wherein a stroke from the second lens to the fifth lens is a fixed lens group, and a refractive power of the fixed lens group is positive.

3. The imaging lens of claim 1, wherein the sixth lens is moved when the imaging lens is focused, and a movement distance of the sixth lens is less than 1.5 mm.

4. The imaging lens of claim 1, wherein the sixth lens is a negative meniscus lens with a convex surface facing an imaging surface.

5. The imaging lens of claim 1, wherein a refractive index of the sixth lens falls within a range of 1.6 to 1.7.

6. The imaging lens of claim 1, wherein an Abbe number of the first lens falls within a range of 40 to 100.

7. The imaging lens of claim 1, wherein a ratio between an effective focal length and an aperture value of the imaging lens is greater than or equal to 7 and less than or equal to 8.

8. The imaging lens of claim 1, wherein a ratio of a radius of curvature of an object side surface of the first lens in an optical axis region to a refractive index of the first lens falls within a range of 5 to 15.

9. The imaging lens of claim 1, wherein a diameter of the second lens to the sixth lens is greater than or equal to 4 mm and less than or equal to 8.5 mm.

10. The imaging lens of claim 1, wherein a ratio of a focal length of the first lens and the spacing between the prism and the second lens on the optical axis is greater than or equal to 5 and less than or equal to 25.

* * * * *